(12) United States Patent
Hogan et al.

(10) Patent No.: US 8,299,161 B2
(45) Date of Patent: Oct. 30, 2012

(54) DEFATTED SOY FLOUR/NATURAL RUBBER BLENDS AND USE OF THE BLENDS IN RUBBER COMPOSITIONS

(75) Inventors: Terrence E. Hogan, Akron, OH (US); William L. Hergenrother, Akron, OH (US); Christopher Robertson, Akron, OH (US); Maria Tallman, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 616 days.

(21) Appl. No.: 11/646,675

(22) Filed: Dec. 28, 2006

(65) Prior Publication Data

US 2007/0161733 A1 Jul. 12, 2007

Related U.S. Application Data

(60) Provisional application No. 60/754,565, filed on Dec. 28, 2005.

(51) Int. Cl.
*C08K 3/22* (2006.01)
*C08K 3/00* (2006.01)
*A63B 37/00* (2006.01)
*C08L 89/00* (2006.01)

(52) U.S. Cl. ............... 524/432; 524/575.5; 524/25
(58) Field of Classification Search ............. 524/15, 524/17, 25, 432, 575.5
See application file for complete search history.

(56) References Cited

U.S. PATENT DOCUMENTS

| | | | | |
|---|---|---|---|---|
| 2,296,464 | A * | 9/1942 | Brown | 530/378 |
| 2,931,845 | A * | 4/1960 | Lehmann | 524/25 |
| 4,421,900 | A * | 12/1983 | Hamed | 525/218 |
| 5,587,411 | A * | 12/1996 | Sakaki et al. | 524/17 |
| 2006/0041036 | A1* | 2/2006 | Mohanty et al. | 524/9 |
| 2006/0094800 | A1* | 5/2006 | Jong | 524/17 |

OTHER PUBLICATIONS

Milner, M. Protein Resources and Technology. Westport, CN: Avi Publishing Company Inc., 1978.*
Soybean Meal INFOcenter Soybean Meal Composition (http://web.archive.org/web/20070906200756/http://www.soymeal.org/sbmcomposition.html), Sep. 6, 2007.*
Kirk-Othmer Encyclopedia of Chemical Technology: Rubber Compounding, Dec. 17, 2004.*
Imanah, J.E. et al.; Rheological and Mechanical Properties of Natural Rubber Reinforced with Agricultural Byproduct; Journal of Applied Polymer Science, vol. 90; (2003) 3718-3722 (5 pages).
Jong, L.; Dynamic Mechanical Properties of Soy Protein Filled Elastomers; Journal of Polymers and the Environment, vol. 13, No. 4; Oct. 4, 2005 (10 pages).
Jong, Lei; Polymer Composites Reinforced by Defatted Soy Flour; Polymer Preprints 46(1) (2005) 298-99 (2 pages).
Jong, Lei; Viscoelastic Properties of Ionic Polymer Composites Reinforced by Soy Protein Isolate; Journal of Polymer Science, Part B: Polymer Physics, vol. 43 (2005) 3503-3518 (16 pages).
Jong, Lei; (Abstract) Polymer Composites Reinforced by Defatted Soy Flour; National Center for Agriculture Utilization Research Department of Agriculture; Peoria; Mar. 17, 2005 (1 page).
Jong, Lei; Characterization of Soy Protein/Styrene-Butadiene Rubber; Composites: Part A 36 (2005) 675-682. (8 pages).
Jong, L.; Characterization of Defatted Soy Flour and Elastomer; Composites; Journal of Applied Polymer Science, vol. 90; (2005) 353-361 (9 pages).
Jong, Lei; Effect of Soy Protein Concentrate in Elastomer Composites: Part A 37 (2006) 438-446. (9 pages).
Jong, L.; Viscoelastic Properties of Natural Rubber Composites Reinforced by Defatted Soy Flour and Carbon Black Co-Filler; Journal of Applied Polymer Science, vol. 106; (2007) 3444-3453 (10 pages).

* cited by examiner

*Primary Examiner* — William Cheung
(74) *Attorney, Agent, or Firm* — Meredith E. Hooker; Jenny L. Sheaffer

(57) ABSTRACT

There is disclosed a composition comprising defatted soy flour and a natural rubber in aqueous or dried form. There is also disclosed rubber compositions comprising the compositions comprising defatted soy flour and a natural rubber. There is further disclosed use of the compositions comprising defatted soy flour and a natural rubber, as well as use of rubber compositions including the compositions comprising defatted soy flour and a natural rubber, in the production of various products such as pneumatic tires and tire components, and the like.

13 Claims, No Drawings

DEFATTED SOY FLOUR/NATURAL RUBBER BLENDS AND USE OF THE BLENDS IN RUBBER COMPOSITIONS

CROSS-REFERENCE

This application claims the benefit of U.S. Provisional Application No. 60/754,565, filed Dec. 28, 2005, which is incorporated herein by reference.

FIELD OF THE DISCLOSURE

The present disclosure relates to a blend of defatted soy flour and natural rubber, and to the use of blends of defatted soy flour and natural rubber in the preparation of rubber compositions.

BACKGROUND OF THE DISCLOSURE

Various additives have been used in the preparation of reinforced rubber compositions. There is a continuing desire to provide additives that are cost effective and are produced from renewable resources.

SUMMARY OF THE DISCLOSURE

The present disclosure relates to compositions comprising defatted soy flour and natural rubber. The present disclosure also relates to use of compositions comprising defatted soy flour and natural rubber in aqueous form and in dried form, in the preparation of compositions comprising a rubber and the composition comprising defatted soy flour and natural rubber.

DETAILED DESCRIPTION OF THE DISCLOSURE

The present disclosure relates to compositions comprising defatted soy flour and natural rubber in aqueous form and in dried form. The present disclosure also relates to use of compositions comprising defatted soy flour and natural rubber in aqueous form and in dried form, in the preparation of compositions comprising a rubber and the composition comprising defatted soy flour and natural rubber.

In more detail, the compositions of the present disclosure, in one embodiment, comprise defatted soy flour and natural rubber in aqueous form and in dried form. The compositions comprise any amounts of defatted soy flour and natural rubber. In one embodiment, the composition comprises about 0.05 to about 100 phr (parts per hundred rubber) of defatted soy flour per hundred parts of natural rubber. In another embodiment, the composition comprises about 0.05 to about 75 phr of defatted soy flour per hundred parts of natural rubber, and in another embodiment, about 0.05 to about 40 phr of defatted soy flour per hundred parts of natural rubber.

In preparing the compositions comprising defatted soy flour and natural rubber, any defatted soy flour may be used, and any natural rubber latex may be used. Natural rubber is a well known, commercially available product. Defatted soy flour is also a well known and commercially available product. Defatted soy flour may be suitably described, for example, in one embodiment, as a product obtained by the following technique. Soy flour may be obtained by finely grinding full-fat dehulled soybeans or defatted flakes produced from dehulled soybeans. Soy flour may be, in one embodiment, comprised of product where at least 97% of which, passes through a 100-mesh standard screen. Defatted soy flour is obtained from solvent extracted flakes, and contains less than 1% of oil. For further information on defatted soy flour, reference is made to "Soybeans: Chemistry and Technology," by Smith, A. K. and Circle, S. J. (1972), Vol. 1, Avi Publishing company, Inc., Westport, Conn. A typical defatted soy flour comprises 59.0% protein, 7.0% moisture, 0.9% fat, 2.6% fiber, and 6.4% ash. Suitable examples of natural rubber latex include but are not limited to, Firestone's HARTEX 101 low ammonia natural latex; Firestone's HARTEX 103 low ammonia natural latex; Firestone's HARTEX 104 ammoniated natural latex; and Firestone's HARTEX 205 ammoniated high solids natural latex.

The compositions comprising defatted soy flour and natural rubber may be prepared by any technique known for such preparation. A suitable method for producing the compositions comprising defatted soy flour and natural rubber is described as follows: Defatted soy flour is added to water, at a temperature of about 20° C. to about 100° C., in an amount such that the weight percent of defatted soy flour in water is about 0.05 to about 50%. In one embodiment, the water is maintained at a temperature of about 25° C. to about 80° C., and in another embodiment, at a temperature of from about 40° C. to about 60° C. In one embodiment, the defatted soy flour is present in the water at a weight percent of about 1 to about 40%, and, in another embodiment, at a weight percent of about 3 to about 30%. The pH of the solution of defatted soy flour in water is about 7 to about 14, in one embodiment. In another embodiment, the pH of the solution is about 7 to about 10, and, in another embodiment, the pH of the solution is about 7.5 to about 9. Optionally, the solution may be cooled. A measured amount of natural rubber is added to the solution of defatted soy flour in water, in an amount such that, in one embodiment, the defatted soy flour is present at a level of about 0.05 to about 100 parts per hundred parts of natural rubber. In another embodiment, the natural rubber is added in an amount such that the defatted soy flour is present at a level of about 0.05 to about 75 parts per hundred parts of natural rubber. In another embodiment, the natural rubber is added in an amount such that the defatted soy flour is present at a level of about 0.05 to about 40 parts per hundred parts of natural rubber. The resulting mixture of defatted soy flour and natural rubber may be stirred, in one embodiment, for a period of from 0 to about 360 minutes. In another embodiment, the mixture may be stirred for about 5 to about 120 minutes, and in another embodiment, for about 15 to about 60 minutes. The mixture may be coagulated, followed by drying by any method known in the art for drying natural rubber, such as by air drying or by vacuum drying. For information on drying of natural rubber, reference is made to "*Rubber Technology*," by Maurice Morton, Kluwer Academic Publishers, Boston, Mass. (1999) pg 184-186.

The rubber compositions of the present disclosure comprise any rubber and the composition comprising defatted soy flour and natural rubber in aqueous form and in dried form, described herein. In preparing the rubber compositions, any amount of the rubber, and any amount of the composition comprising defatted soy flour and natural rubber in aqueous form or in dried form may be used. In one embodiment, the rubber composition comprises about 0.05 to about 200 phr of the composition comprising defatted soy flour and natural rubber, per hundred parts of the rubber, and, in another embodiment, from about 10 to about 150 phr of the composition comprising defatted soy flour and natural rubber, per hundred parts of the rubber.

In preparing the rubber compositions herein, any of the compositions comprising defatted soy flour and natural rubber described herein may be used. Any rubber may be used in producing the rubber compositions of the present disclosure.

Suitable rubbers include, but are not limited to, any natural rubbers, synthetic rubbers and mixtures thereof. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more alpha-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. In one embodiment, elastomers include natural rubber, isoprene, styrene-butadiene copolymers, and butadiene rubber, and mixtures thereof, as a result of their common usage in the tire industry.

The rubber compositions herein may be prepared in accordance with any process known in the art. For example, the rubber compositions may be compounded or blended using mixing equipment and procedures conventionally employed in the art, such as kneaders, roll mills, and extruders.

The rubber compositions may comprise further ingredients that are known and conventional in the rubber compositions, such as fillers and additive materials such as, but not limited to, curing agents (for a general disclosure of suitable vulcanizing agents one can refer to Kirk-Othmer, *Encyclopedia of Chemical Technology*, 3$^{rd}$ ed., Wiley Interscience, N.Y. 1982, Vol. 20, pp. 365-468, particularly "*Vulcanization Agents and Auxiliary Materials*" pp. 390-402), activators, retarders and accelerators; processing additives, such as oils; resins, including tackifying resins; plasticizers; pigments; additional fillers, fatty acid; zinc oxide; waxes; antioxidants; antiozonants; peptizing agents; and the like. As known to those skilled in the art, the additives mentioned above are selected and commonly used in conventional amounts. For example, without limitation, a tire component compound typically contains elastomers, fillers, processing oils/aids, antidegradants, zinc oxide, stearic aid, sulfur, accelerators and coupling agents. Such compounds can have such additional ingredients in the following amounts:

Fillers: from about 0 to about 150 phr, and in another embodiment, from about 30 to about 80 phr;

Processing oils/aids: from about 0 to about 75 phr, and in another embodiment, from about 0 to about 40 phr;

Antidegradants: from about 0 to about 10 phr, and in another embodiment, from about 0 to about 5 phr;

Stearic acid: from about 0 to about 5 phr, and in another embodiment, from about 0 to about 3 phr;

Zinc oxide: from about 0 to about 10 phr, and in another embodiment, from about 0 to about 5 phr;

Sulfur: from about 0 to about 10 phr, and in another embodiment, from about 0 to about 5 phr; and Coupling agent: from about 0 to about 30 phr, and in another embodiment, from about 5 to about 15 phr.

Other fillers that may be used include carbon black, alumina, aluminum hydroxide, magnesium hydroxide, clays (hydrated aluminum silicates) and starch.

Processing aids commonly include a broad category of substances that improve various aspects of the process of forming vulcanizable compositions and vulcanizates. For example, processing aids may prevent filler agglomeration and reduce viscosity.

Certain additional fillers can be utilized as processing aids, including clay (hydrous aluminum silicate), talc (hydrous magnesium silicate), aluminum hydrate, mica, and sodium sulfate. In one embodiment, micas principally containing alumina and silica are used.

Rubber curing agents may be employed, including sulfur or peroxide-based curing systems. Curing agents are described in Kirk-Othmer, *Encyclopedia of Chemical Technology*, Vol. 20, pp. 365468, (3$^{rd}$ Ed. 1982), particularly *Vulcanization Agents and Auxiliary Materials*, 390-402, and A. Y. Coran, *Vulcanization in Encyclopedia of Polymer Science and Engineering* (2$^{nd}$ Ed. 1989), which are incorporated herein by reference. Vulcanizing agents may be used alone or in combination.

Accelerators that may be used suitably include thiazoles, dithiocarbamates, dithiophosphates, guanidines, sulfenamides, sulfenimides, and thiurams. Specific examples include 2-mercaptobenzothiazole, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine.

Oils, waxes, scorch inhibiting agents, tackifying resins, reinforcing resins, fatty acids, peptizers, and zinc oxide may also be employed.

In preparing the rubber compositions, in one embodiment, an initial masterbatch is prepared that includes the rubber component and the reinforcing fillers, as well as other optional non-curative additives, such as processing oil, antioxidants, and the like. After the masterbatch is prepared, one or more optional remill stages can follow in which either no ingredients are added to the first mixture, or the remainder of the non-curing ingredients are added, in one embodiment, to reduce the compound viscosity and improve the dispersion of the reinforcing filler. The final step of the mixing process is the addition of vulcanizing agents to the mixture.

In more detail concerning the masterbatch process, the vulcanizable rubber composition may be prepared by forming an initial masterbatch composition that includes elastomer and other ingredients. To prevent premature vulcanization, this initial composition generally excludes any vulcanizing agents.

Once the initial masterbatch composition is processed, the vulcanizing agents may be introduced and blended into the initial masterbatch to form a final mix. Additional ingredients, such as accelerators, may be added to the final mix during this stage. The final mix in one embodiment, is prepared at low temperatures that do not initiate the vulcanization process.

Optionally, additional mixing stages can be employed between the initial stage and the final mix stage. Additional mixing stages where no additional ingredients are added can be referred to as remill stages, while mixing stages where ingredients are added are called masterbatch stages, and can be further denoted by ordinal designations, such as second masterbatch and so on.

For the initial masterbatch mixing step, and any subsequent masterbatch mixing steps, the initial mixer temperature is in one embodiment, from about 25° C. to about 140° C., and in, another embodiment, from about 70° C. to about 120° C. The mixing conditions are in one embodiment, controlled to maintain the surface temperature of the composition within the range of about 25° C. to about 195° C., in another embodiment, about 100° C. to about 185° C., and in another embodiment, about 135° C. to about 165° C. during mixing. These mixing conditions are maintained for the amount of time necessary to achieve good dispersion of the filler within the rubber.

In between each mixing stage, the mixed composition may be cooled to a surface temperature below the intended temperature for the next mixing step. This may be accomplished by discharging the mixed composition, cooling, and recharging the same mixer apparatus or transferring the composition to another mixer. Alternatively, the mixed composition may be cooled within the mixer.

During the optional remill mixing steps, the mixing conditions are in one embodiment, controlled to achieve a surface temperature of the composition within the range of about 70° C. to about 175° C., in another embodiment, about 135° C. to about 165° C., and in another embodiment, about 140° C. to about 160° C. These mixing conditions are maintained for the amount of time necessary to reduce the viscosity and improve the dispersion of the filler within the rubber. A remill step may be performed in the same mixer used for the masterbatches, or the mixture may be transferred to another mixer.

The final mixing stage, during which the cure agents and accelerators are added, is performed at a temperature below the vulcanization temperature. More specifically, the mixing conditions are in one embodiment, controlled to achieve a surface temperature of the composition within the range of about 40° C. to about 120° C., in another embodiment, about 60° C. to about 110° C., and in another embodiment, about 75° C. to about 100° C. These conditions are maintained for the amount of time necessary to achieve good mixing.

The invention will be more readily understood by reference to the following examples. There are, of course, many other forms of the invention which will become obvious to one skilled in the art, once the invention has been fully disclosed, and it will accordingly be recognized that these examples are given for the purpose of illustration only, and are not to be construed as limiting the scope of this invention in any way.

EXAMPLES

The following test procedures were used in evaluating the performance of the rubber compositions of the Examples.

Mooney Viscosity—ASTM-D 1646-89

Tensile—ASTM-D412(1998) Method B, at 25° C.

Elongation—ASTM-D412(1998) Method B, at 25° C.

300% Modulus—ASTM-D412(1998) Method B, at 25° C.

Storage Modulus (G')—is obtained by subjecting a sample having a diameter of about 8 mm and a height of about 15 mm, to an ARES instrument, that is available from TA Instruments, New Castle, Del. The ARES instrument may be used in measurement of oscillatory shear. In determining G', the ARES instrument is operated at a temperature of 50° C., a frequency of 1 Hz, and a strain of 5%. This strain represents the maximum strain at the outer diameter of the cylindrical sample.

Example 1

In this Example 1, there is described the preparation of a composition comprising defatted soy flour and natural rubber.

To a 2 L beaker was added 1 kg of water heated to 55° C. and 55 g of defatted soy flour containing 10% water with stirring. The pH was adjusted to 8.5 with 0.3 mL saturated sodium hydroxide (aq). The solution was cooled to room temperature, and 163 g of HARTEX 104 latex (60.7% natural rubber) was added slowly with stirring. The dispersion was placed into pans and dried overnight at room temperature. The material was subsequently dried in a vacuum oven at 50° C. for 24 hrs. This produced a 33.6 wt % dispersion of defatted soy flour in natural rubber.

Examples 2-7

In evaluating the performance of the composition of Example 1 comprising a 33.6 weight % dispersion of defatted soy flour in natural rubber, the dispersion was compounded in each of the rubber compounds of Examples 2-7. Each of the rubber compounds was prepared in two portions, identified as Initial Formulation shown in Table 1, and Final Formulation, shown in Table 2.

In preparing the Initial Formulation portion, the rubber, SBR, with and without the dispersion of defatted soy flour in natural rubber, of Example 1, was mixed with carbon black, an antioxidant, stearic acid, wax, aromatic oil, and zinc oxide. The SBR rubber comprises 23.5% styrene, with the balance butadiene. The units of Tables 1 and 2 are weight-parts.

The Initial Formulation portion was prepared as follows, using a 65 g Banbury mixer operated at 60 rpm (revolutions per minute), at a temperature of 133° C. In doing so, the SBR and optionally the dispersion of Example 1, was placed in the mixer, and after 0.5 minutes, all other ingredients, except the stearic acid, were added. The stearic acid was then added after 3 minutes. The ingredients of the Initial Formulation were mixed for an additional 5-6 minutes. At the end of the mixing, the temperature of the mixer was about 165° C. The resultant product was transferred to a mill operating at a temperature of about 60° C., where the product was then sheeted and subsequently cooled to room temperature.

The Final Formulation portions, shown in Table 2, were prepared as follows. The Initial Formulation portions of each of Examples 2-7 were added to the mixer, simultaneously with the curative materials. The initial mixer temperature was about 65° C., and the mixer was operating at about 60 rpm. The Final Formulation portion was removed from the mixer after about 2.25 minutes, at which time the temperature of the Final Formulation portion was about 100-105° C. The Final Formulation portions were sheeted into 3×6×0.075 inch (76× 152×1.9 mm) sheets. The Final Formulation sheets were cured at about 160° C. for about 15 minutes, in standard molds placed in a hot press.

The Final Formulation portions of Examples 2-7, as shown in Table 2, were evaluated. The results are reported in Table 3.

TABLE 1

Initial Formulation*

| Ingredient | Example 2 (Control) | Example 3 (Control) | Example 4 (Control) | Example 5 | Example 6 | Example 7 |
|---|---|---|---|---|---|---|
| SBR[1] | 50 | 50 | 50 | 50 | 50 | 50 |
| Example 1 Dispersion | 0 | 0 | 0 | 25 | 25 | 50 |
| HARTEX 104 Natural Latex | 50 | 50 | 50 | 33.4 | 33.4 | 16.8 |
| CRX 1343 Carbon Black | 55 | 42.26 | 30.62 | 57.63 | 44.28 | 33.55 |
| Wax | 1 | 1 | 1 | 1 | 1 | 1 |
| Antioxidant (6-PPD) | 0.95 | 0.95 | 0.95 | 0.95 | 0.95 | 0.95 |
| Zinc Oxide | 2.5 | 2.5 | 2.5 | 2.5 | 2.5 | 2.5 |
| Stearic Acid | 2 | 2 | 2 | 2 | 2 | 2 |
| Aromatic Oil | 10 | 10 | 10 | 10 | 10 | 10 |
| Total | 171.45 | 158.71 | 147.07 | 182.48 | 169.13 | 166.8 |

*The units are weight-parts.
[1]SBR is 23.5% styrene, $T_g = -62°$ C., and has a 55 $ML_{1+4}$ at 100° C.

TABLE 2

Final Formulation*

| Ingredient | Example 2 (Control) | Example 3 (Control) | Example 4 (Control) | Example 5 | Example 6 | Example 7 |
|---|---|---|---|---|---|---|
| Initial Formulation | 171.45 | 158.71 | 147.07 | 182.48 | 169.13 | 166.8 |
| Sulfur | 1.3 | 1.3 | 1.3 | 1.3 | 1.3 | 1.3 |
| Accelerators (CBS and DPG) | 1.9 | 1.9 | 1.9 | 1.9 | 1.9 | 1.9 |
| Total | 174.65 | 161.91 | 150.27 | 185.68 | 172.33 | 170.00 |

*The units are weight-parts.

TABLE 3

Physical Properties of Compounded Stocks.

| Property | Example 2 (Control) | Example 3 (Control) | Example 4 (Control) | Example 5 | Example 6 | Example 7 |
|---|---|---|---|---|---|---|
| Volume Fraction Carbon Black | 0.1970 | 0.1586 | 0.1202 | 0.1970 | 0.1586 | 0.1202 |
| Total Volume Fraction Filler | 0.1999 | 0.1616 | 0.1233 | 0.2364 | 0.1999 | 0.1999 |
| $ML_{1+4}$@130° C.: | 53.9 | 44.8 | 38.7 | 60.3 | 47.9 | 43.3 |
| 300% Modulus @23° C. (MPa) | 13.3 | 9.7 | 4.9 | 17.1 | 11.2 | 8.5 |
| $T_b$@23° C. (MPa) | 20.5 | 20.7 | 16.7 | 20.1 | 19.6 | 17.1 |
| $E_b$ @23° C. (%) | 411 | 487 | 578 | 344 | 446 | 481 |

From the data reported in Tables 1, 2, and 3, the following observations can be made. The observations are based on comparing Example 2 with Example 5; Example 3 with 6; and Example 4 with 7. The comparison reveals that addition of the dispersion of defatted soy flour in natural rubber to an otherwise similar rubber composition results in increased 300% modulus, increased Mooney viscosity, and decreased elongation at break. These results are indicative that the dispersion of defatted soy flour in natural rubber is providing reinforcement to the rubber compositions.

Example 8

This example describes an alternate method for producing a composition comprising defatted soy flour and natural rubber. In this method, 300 g of water heated to 55° C., and 55 g of defatted soy flour were added to a 2 L beaker, with stirring. The pH of the resulting solution was adjusted to about 8.5 with 0.3 mL aqueous saturated sodium hydroxide. The solution was cooled to room temperature, and 163 g of HARTEX 104 natural rubber latex (60.7% natural rubber) was added slowly with stirring. The resulting dispersion of defatted soy flour in natural rubber was placed into pans and dried overnight at room temperature. The material was subsequently dried in a vacuum oven at 50° C. for 24 hours. There was produced a 33.6 weight % dispersion of defatted soy flour in natural rubber.

Examples 9-14

In these examples, the effectiveness of the performance of the dispersion of defatted soy flour in natural rubber of Example 8, in rubber compositions, is shown. The rubber composition comprising the dispersion of defatted soy flour in natural rubber, as shown in Example 8, are described in Examples 9-14, of Tables 4 and 5. The rubber compositions were prepared in two portions, identified as Initial Formulations of Table 4, and Final Formulations of Table 5.

In preparing the Initial Formulations of Table 4, the natural rubber, with or without the dispersion of defatted soy flour in natural rubber of Example 8, was mixed with antioxidant, stearic acid, wax, aromatic oil, and zinc oxide. The Initial Formulation portion was produced by mixing the components in a 65 g Banbury mixer, operating at 60 rpm and at a temperature of 133° C. In doing so, the natural rubber was placed in the mixer, and after 0.5 minutes, the remaining ingredients, except for the stearic acid, were added to the mixer. After 3 minutes, the stearic acid was added to the mixer. The Initial Formulation portions were mixed for 5-6 minutes. At the end of the mixing, the temperature was about 165° C. The Initial Formulation portions shown in Table 4, were transferred to a mill operating at a temperature of about 60° C., where the portions were sheeted and subsequently cooled to room temperature.

Thereafter, the Initial Formulation portions of Table 4 were utilized in preparing the Final Formulation portions, shown in Table 5. In so doing, the Initial Formulation portions of Table 4 were added simultaneously with the curative materials of Table 5, to the mixer and then mixing the ingredients. The initial mixer temperature was about 65° C., and was operating at 60 rpm. After 2.25 minutes in the mixer, the Final Formulation portions, having a temperature of about 100-105° C., was removed from the mixer. The Final Formulation portions were sheeted into 3×6×0.075 inch (76×152×1.9 mm) sheets. The resultant materials were cured at a temperature of about 160° C. for about 15 minutes, in standard molds placed in a hot press.

The Final Formulation portions of Table 5 were then evaluated for performance characteristics when incorporated in rubber compositions. The data is reported in Table 6.

TABLE 4

Initial Formulation*

| Ingredient | Example 9 (Control) | Example 10 | Example 11 | Example 12 | Example 13 | Example 14 |
|---|---|---|---|---|---|---|
| HARTEX 104 Natural Latex | 100 | 80 | 60 | 40 | 20 | 0 |
| Example 8 Dispersion | 0 | 30.12 | 60.24 | 90.36 | 120.5 | 150.6 |
| Oil (Aromatic &Rosin Oil) | 17 | 17 | 17 | 17 | 17 | 17 |
| Wax | 3 | 3 | 3 | 3 | 3 | 3 |
| Antioxidant (6PPD&TMQ)** | 3.5 | 3.5 | 3.5 | 3.5 | 3.5 | 3.5 |
| Zinc Oxide | 2.5 | 2.5 | 2.5 | 2.5 | 2.5 | 2.5 |
| Stearic Acid | 1.5 | 1.5 | 1.5 | 1.5 | 1.5 | 1.5 |
| SUBTOTAL MASTERBATCH (PHR) | 127.5 | 137.62 | 147.74 | 157.86 | 168 | 178.1 |

*The units are weight-parts.

**6PPD = N-(1,3-dimethylbutyl)-N'-phenyl-p-phenylenediamine, and TMQ = 2,2,4-trimethyl-1,2-dihydroquinoline, polymerized.

TABLE 5

Final Formulation*

| Ingredient | Example 9 (Control) | Example 10 | Example 11 | Example 12 | Example 13 | Example 14 |
|---|---|---|---|---|---|---|
| Initial | 127.5 | 137.62 | 147.74 | 157.86 | 168 | 178.1 |
| Sulfur | 1.3 | 1.3 | 1.3 | 1.3 | 1.3 | 1.3 |
| Accelerators (TBBS) | 0.2 | 0.2 | 0.2 | 0.2 | 0.2 | 0.2 |
| Total | 129 | 139.12 | 149.24 | 159.36 | 169.5 | 179.6 |

*The units are weight-parts.

TABLE 6

Physical Properties of Compounded Stocks.

| Property | Example 9 (Control) | Example 10 | Example 11 | Example 12 | Example 13 | Example 14 |
|---|---|---|---|---|---|---|
| Total Volume Fraction Filler | 0.00327 | 0.05341 | 0.09875 | 0.13994 | 0.1776 | 0.21198 |
| G'@25° C. (MPa) | 0.570 | 0.736 | 0.847 | 1.074 | 1.288 | 1.809 |

From the data reported in Table 6, the comparison to be made is that of a control (Example 9) that contains no dispersion of defatted soy flour in natural rubber, shown in Example 8, with the rubber compositions of Examples 10-14 that contain increasing amounts of the dispersion of defatted soy flour in natural rubber shown in Example 8.

It can be readily noted that, in all instances, the rubber compositions of Examples 10-14, that contain the dispersion of defatted soy flour in natural rubber, are characterized by having a value for G' at 25° C., that is greater than that of the control, Example 9, where the rubber composition does not contain any of the dispersion of defatted soy flour in natural rubber. Furthermore, from the data reported, it is apparent that, in Examples 10-14, the amount of the dispersion of defatted soy flour in natural rubber was continually increased. The rubber compositions of Examples 10-14 were shown, in Table 6, as having an increasingly higher value of G' at 25° C., as the amount of the dispersion of defatted soy flour in natural rubber increases in the rubber composition.

The increase in G' (storage modulus) is an indicator that the composition comprising defatted soy flour and natural rubber is performing as a reinforcing agent for the rubber compositions.

Example 15

In this Example, the procedure of Examples 1 and 5-7 is followed, except that the latex of styrene-butadiene is utilized in Example 1, and the dispersion of defatted soy flour and SBR is used in Examples 5-7.

It is expected that the resultant rubber compositions comprising styrene-butadiene (SBR) and the composition comprising defatted soy flour and natural rubber, will be characterized by enhanced reinforcement properties.

Example 16

In this Example, the procedure of Examples 1 and 5-7 is followed, except that the latex of butadiene rubber is utilized in Example 1, and the dispersion of defatted soy flour and butadiene is used in Examples 5-7.

It is expected that the resultant rubber compositions comprising butadiene rubber (BR) and the composition comprising defatted soy flour and natural rubber, will be characterized by enhanced reinforcement properties.

It is expected that the rubber compositions of the present invention, that include the dispersions of defatted soy flour in natural rubber, will be useful in preparing pneumatic tires, tire components such as treads, subtreads, sidewalls, body ply skims, bead filler, hoses, belts, and the like.

The invention has been described with reference to various specific and illustrative embodiments and techniques. However, one skilled in the art will recognized that many variations and modifications may be made while remaining within the spirit and scope of the invention.

What is claimed is:

1. A vulcanized tire product comprising a rubber composition said tire product selected from the group consisting of a pneumatic tire, a tire tread, a tire subtread, a tire sidewall, a tire body ply skim, a tire bead filler, a hose, and a belt wherein the rubber composition comprises a rubber and an aqueous or dried composition consisting essentially of defatted soy flour and natural rubber,
   wherein the natural rubber is non-carboxylated and non-sulfonated,
   wherein the aqueous or dried composition is present in an amount ranging from about 0.05 to about 200 parts, per hundred parts of the rubber,
   wherein the defatted soy flour present in the aqueous or dried composition ranges from about 0.05 to about 75 parts, per hundred parts of the natural rubber, and
   wherein the aqueous or dried composition is formed by solvating the defatted soy flour in a natural rubber latex, after which the combination is dried to form a dispersion of defatted soy flour in natural rubber.

2. A vulcanized tire product according to claim 1 wherein the aqueous or dried composition is present in an amount ranging from about 10 to about 150 parts, per hundred parts of the rubber.

3. A vulcanized tire product according to claim 1 wherein the rubber is selected from the group consisting of a natural rubber, an elastomer, a synthetic rubber, and mixtures thereof.

4. A vulcanized tire product according to claim 1 wherein the rubber composition further comprises at least one of a carbon black, an antioxidant, stearic acid, a wax, an aromatic oil, and zinc oxide.

5. A vulcanized tire product according to claim 4, wherein the rubber is selected from the group consisting of styrene-butadiene, natural rubber, and mixtures thereof.

6. A vulcanized tire product according to claim 1 the rubber is styrene-butadiene.

7. A vulcanized tire product according to claim 1 wherein the rubber is butadiene rubber.

8. A vulcanized tire product according to claim 1 wherein the rubber is a mixture comprising styrene-butadiene, and natural rubber.

9. A vulcanized tire product according to claim 1 wherein the rubber is natural rubber.

10. A vulcanized tire product according to claim 1, wherein the amount of defatted soy flour present in the aqueous or dried composition ranges from about 0.05 to about 40 parts, per hundred parts of the natural rubber.

11. A vulcanized tire product according to claim 1, wherein a vulcanized final product formed from the rubber composition has a 300% modulus of at least 8.5 MPa.

12. A vulcanized tire product according to claim 1 wherein the rubber composition further includes sulfur present in an amount ranging from about 0 to about 10 parts, per hundred parts of the rubber.

13. A vulcanized tire product according to claim 1 wherein the rubber composition further includes a coupling agent present in an amount ranging from about 0 to about 30 parts, per hundred parts of the rubber.

* * * * *